United States Patent
Abramov et al.

(10) Patent No.: US 9,661,502 B2
(45) Date of Patent: May 23, 2017

(54) SMS FRAUD DETECTION

(71) Applicant: MARKPORT LIMITED, Dublin (IE)

(72) Inventors: Ilia Abramov, Amersfoort (NL); Tomas Petrilak, Menin (CZ); Victor Scripcaru, Voorburg (NL)

(73) Assignee: MARKPORT LIMITED, Dublin (IE)

( * ) Notice: Subject to any disclaimer, the term of this patent is extended or adjusted under 35 U.S.C. 154(b) by 0 days.

(21) Appl. No.: 14/893,302

(22) PCT Filed: May 13, 2014

(86) PCT No.: PCT/EP2014/059741
§ 371 (c)(1),
(2) Date: Nov. 23, 2015

(87) PCT Pub. No.: WO2014/187696
PCT Pub. Date: Nov. 27, 2014

(65) Prior Publication Data
US 2016/0174077 A1   Jun. 16, 2016

(30) Foreign Application Priority Data
May 23, 2013   (EP) .................................... 13169030

(51) Int. Cl.
H04M 1/68    (2006.01)
H04W 12/12   (2009.01)
H04L 12/58   (2006.01)
H04L 29/06   (2006.01)
H04W 4/14    (2009.01)

(52) U.S. Cl.
CPC ............. H04W 12/12 (2013.01); H04L 51/12 (2013.01); H04L 51/38 (2013.01); H04L 63/126 (2013.01); H04L 63/1466 (2013.01); H04W 4/14 (2013.01)

(58) Field of Classification Search
CPC ......... H04W 4/12; H04W 4/14; H04W 48/16; H04W 8/02; H04W 88/14; H04W 88/16; H04W 88/184
USPC ....... 455/414.1, 410, 411, 433, 435.1, 435.2, 455/435.3, 466
See application file for complete search history.

(56) References Cited

U.S. PATENT DOCUMENTS

| 6,546,416 B1 | 4/2003 | Kirsch |
| 2003/0043853 A1 | 3/2003 | Doyle et al. |
| 2005/0044352 A1 | 2/2005 | Pazi et al. |

(Continued)

OTHER PUBLICATIONS

International Search Report dated Aug. 1, 2014 from corresponding PCT/EP2014/059741, pp. 3.

(Continued)

Primary Examiner — Jean Gelin
(74) Attorney, Agent, or Firm — Ohlandt, Greeley, Ruggiero & Perle, L.L.P.

(57) ABSTRACT

A receiving network detects fraudulent messages received via a grey route. At a start of a session, a message delivery request is sent to a Short Message Service (SMS) node in the receiving network. This sends a request to a Home Location Register (HLR) of a supposedly originating network for routing information concerning an originator. Upon receiving a response from the HLR, it requests validation of retrieved information, to validate both the originator and the originating network. The SMS node also makes an HLR look-up for a recipient, before performing message delivery.

10 Claims, 3 Drawing Sheets

(56) References Cited

U.S. PATENT DOCUMENTS

| | | | |
|---|---|---|---|
| 2007/0281718 A1* | 12/2007 | Nooren | H04L 12/585 455/466 |
| 2008/0026778 A1* | 1/2008 | Cai | H04L 12/585 455/466 |
| 2008/0081646 A1* | 4/2008 | Morin | H04W 4/12 455/466 |
| 2008/0092225 A1 | 4/2008 | Nieuwenhuis | |
| 2008/0176589 A1* | 7/2008 | Bantukul | H04W 8/12 455/466 |
| 2008/0274719 A1* | 11/2008 | Russell | H04W 4/12 455/412.1 |
| 2009/0111489 A1* | 4/2009 | Wilson | H04W 4/14 455/466 |
| 2009/0131087 A1* | 5/2009 | Johan | H04W 4/14 455/466 |
| 2009/0233630 A1* | 9/2009 | Wilson | H04W 4/14 455/466 |
| 2010/0105355 A1 | 4/2010 | Nooren | |
| 2010/0130238 A1* | 5/2010 | Kupsh | H04L 12/5855 455/466 |
| 2010/0235911 A1* | 9/2010 | Nooren | H04L 63/1441 726/22 |
| 2010/0298014 A1* | 11/2010 | Kamphuis | H04W 4/14 455/466 |
| 2012/0083243 A1* | 4/2012 | Kahn | H04M 15/00 455/406 |
| 2015/0237487 A1* | 8/2015 | Titcombe | H04W 4/14 455/466 |

OTHER PUBLICATIONS

International Written Opinion dated Aug. 1, 2014 from corresponding PCT/EP2014/059741, pp. 5.

International Preliminary Report on Patentability (IPRP) dated Nov. 24, 2015 from corresponding PCT/EP2014/059741, pp. 6.

* cited by examiner

SMS FRAUD DETECTION

CROSS-REFERENCE TO RELATED APPLICATIONS

The present application is a U.S. national stage entry of International Patent Application No. PCT/EP2014/059741, filed May 13, 2014, which claims priority to European Patent Application No. 13169030.7, filed May 23, 2013.

BACKGROUND OF THE DISCLOSURE

1. Field of the Disclosure

The invention relates to detection of "SMS Grey Routes" type of fraud, SMS routes that are legal for one country or the party on one end, but illegal on the alternative end.

2. Description of the Related Art

Our prior published US patent specification number US2008/092225 describes an approach to preventing entry of spam messages into a network. It is based on correlating an incoming SRI-for-SM request with the subsequent incoming MT-FSM message delivery attempt.

US2010/0105355 (Nooren) describes a method and system for detection of an unauthorized service message in a network. This approach is based on USSD (unstructured supplementary service data) service.

US2008/0026778 (Cai et al) describes message spoofing detection via validation of an originating switch (e.g. MSC). This is related to the SMS-SC incoming Mobile Originating (MO) type of SMS traffic, while "SMS grey routes" relate to incoming foreign Mobile Terminated (MT) type of SMS traffic.

There is an increasing problem with the extent of messages received into networks which are fraudulent because of faking of originating subscribers or networks.

SMS-based marketing is becoming increasingly utilized and powerful in everyday society. Studies show that consumers are much more likely to read and respond to text messages than traditional electronic channels, such as e-mail. As with any other market, mobile marketing landscape is also subjected to a certain level of legality. Crossing its boundaries would take place in the area of low-cost, bulk SMS delivery.

A lot of SMS service providers (or SMS "aggregators", but not operators) are currently offering wholesale SMS services at a reduced price to their customers. Although in itself this is not necessarily an illegal activity (when based on direct connectivity to the operator's network), it has been observed that conveying of short messages in many cases relies on indirect routes (either through interconnect hubs or other operator interconnect routes). Such routes can be perfectly legal on one end (originating or terminating), but they can be illegal on the other end respectively. These are so-called "Grey Routes". An example is a marketing campaign realized through networks of mobile operator A targeting the subscriber base of operator B. Depending on interconnect agreements between operator A and operator B, these routes can be either legal or illegal. The lawfulness of conveying the traffic through a particular route might be based only on human-to-human traffic, while messages delivered in the scope of advertisement campaigns are prohibited.

Another related example of "grey routes" is based on detecting SMS traffic exchange via SS7 links, while the interconnect agreements between the two operators are set to be via SMPP interconnect links only.

In many cases, to avoid the detection of agreement violation, the source of the "illegal" messages appears to be perfectly legal as it fakes either a mobile originating MSISDN or the originating mobile network.

Exploitation of the grey routes is generally utilized to lower the cost of inter-network SMS termination of any nature (peer to peer, application to peer and peer to application). The invention addresses this problem.

GLOSSARY OF TERMS AND THEIR DEFINITION

3GPP $3^{rd}$ Generation Partnership Project. The organisation that publishes and maintains the GSM-based standards from 2G through 3G to 4G.

Grey Route A type of inter-operator traffic routes that is legal for one country or the party on one end, such as the sender or the receiver, but deemed to be prohibited at the other end i.e. origination or termination.

GSMA GSM Association is an association of mobile operators and related companies devoted to supporting the standardizing, deployment and promotion of the GSM mobile telephone system.

GT Global Title is an address used in SCCP protocol for routing signalling messages on telecommunications networks. In theory, a global title is a unique address which refers to only one destination, though in practice destinations can change over time.

HLR The Home Location Register is the database that contains a subscription record for each subscriber of the network. A GSM subscriber is typically associated with one particular HLR. The HLR is responsible for the sending of subscription data to the VLR (during registration) or GMSC (during mobile terminating call handling).

IMSI International Mobile Subscriber Identity is embedded on the SIM card and is used to identify a subscriber. The IMSI is also contained in the subscription data in the HLR. The IMSI is used for identifying the subscriber for various processes in the GSM network.

MAP Mobile Application Part is the signalling protocol used for call control, subscriber registration, short message service, etc.; MAP is used over many of the GSM network interfaces MAP SC MAP Service Centre MSC the mobile service switching centre (MSC) is the core switching entity in the network. The MSC is connected to the radio access network (RAN); the RAN is formed by the BSCs and BTSs within the Public Land Mobile Network (PLMN). Users of the GSM network are registered with an MSC; all calls to and from the user are controlled by the MSC. A GSM network has one or more MSCs, geographically distributed.

MSISDN Mobile Station Integrated Services Digital Network Number is used to identify the subscriber when, among other things, establishing a call to that subscriber or sending an SMS to that subscriber.

SCCP Signalling Connection Control Part—part of the SS7 stack that provides the signalling connection between two signalling end-points in the SS7 network.

SMS Short Message Service—a text messaging service component of phone, web, or mobile communication systems, using standardized communications protocols that allow the exchange of short messages between fixed line or mobile phone devices.

SMS-C Short message service centre is a network element in the mobile telephone network which delivers SMS messages.

SRI-for-SM SendRoutingInformationforShortMessage. GSM/3GPP MAP operation issued by an SMSC in order to determine where (which network element) to send the message for onward delivery to the recipient.

STP Signalling Transfer Point

VLR the visitor location register (VLR) contains subscriber data for subscribers registered in an MSC. Every MSC contains a VLR. Although MSC and VLR are individually addressable, they are always contained in one integrated node.

PLMN Public Land Mobile Network

SUMMARY OF THE DISCLOSURE

According to the invention in one aspect, there is provided a method performed by a receiving home PLMN including a receiving node, the method comprising the steps of:

the receiving node in the home PLMN receiving a delivery request from a foreign source node (101) in a foreign PLMN, and:
(a) the receiving node querying a location register to determine the address of the originator, and a node validating the authenticity of the address of the originator, and
(b) a node validating the route of the message by comparing the address of the queried location register with the address of the foreign source node, and wherein said validation (a) and (b) is performed before attempting to perform tasks for delivery of the message.

In one embodiment, the step (b) includes verifying association of the foreign source node with a foreign location register. Preferably, the query in step (a) is made to a location register of another network, and most preferably to a location register of said foreign network.

In one embodiment, the validation step (b) includes identifying a source address of the responding HLR (102) according to SCCP CgPa GT address digits. Preferably, the validation step (b) uses said digits to compare the addresses belonging to the responding HLR and to the source node initiating the delivery of the MT short message. In one embodiment, a configurable sub-set of the digits are used in the comparison.

In one embodiment, the validation step (b) includes comparing the SCCP CgPa GT address digits of the responding HLR against the SCCP CgPa GT address digits identifying the initiating MT delivery foreign SMS node.

In one embodiment, the validation step (b) includes comparing the SCCP CgPa GT address digits of the responding HLR against the GSM MAP Service Centre originating address digits identifying the initiating MT delivery foreign SMS node.

Preferably, the receiving node performs the query and validation steps whether the messaging uses SS7 or SMPP.

In one embodiment, for step (a) an MT message is received by the receiving node over SMPP links, an originator MSISDN is extracted, validity of the originating MSISDN and its association with the source network is checked by performing a SRI-for-SM operation for the originating MSISDN.

Preferably, the SRI-for-SM operation is performed towards a local HLR or other database such as a number portability database, and upon completion of this operation a further validity check is performed.

A node of a mobile network comprising digital data processors and ports for transmitting and receiving data, wherein the node is programmed to perform the steps of:

receiving a delivery request from a foreign source node in a foreign PLMN, and:
(a) querying a location register to determine the address of the originator, and validating the authenticity of the address of the originator, and
(b) validating the route of the message by comparing the address of the queried location register with the address of the foreign source node, and wherein said validation (a) and (b) is performed before attempting to perform tasks for delivery of the message.

According to the invention in another aspect, there is provided a method performed by a receiving mobile network including a receiving node and a location register, the method comprising the steps of:

the receiving node receiving a request form an originator in another network,
the receiving node querying a location register to determine an address of the originator device, such as an originator MSISDN, and
a node validating the originator address.

In one embodiment, said validation is performed before attempting to perform tasks for delivery of the message.

In one embodiment, the query is made to a location register of another network.

In one embodiment, the validation includes validating originator existence.

In one embodiment, the validation includes checking if the originating network matches a list of valid originating networks.

In one embodiment, the receiving node is an SMS router.

In one embodiment, the receiving node also performs a conventional HLR look-up for the recipient before performing message delivery.

In one embodiment, the receiving node validates the originator address by comparing an address extracted from an incoming routing request or message against an address in a register.

In one embodiment, the validation step includes checking authenticity of an MSISDN, and if unavailable, generating an error output.

In one embodiment, the validation step includes using the originator IMSI to verify association of the subscriber with the originating operator.

In one embodiment, the validation step includes identifying a source address of the responding HLR according to SCCP CgPa GT address digits.

In one embodiment, the validation step uses said digits to compare the addresses belonging to the responding HLR and the SMS node originating the MT short message. In one embodiment, a configurable sub-set of the digits are used in the comparison. In one embodiment, the validation includes comparing SCCP CgPa GT address digits of the responding HLR against address digits identifying the originating foreign SMS node.

In one embodiment, the receiving node performs the query and validation steps whether the messaging uses SS7 or SMPP.

In one embodiment, the receiving mobile network implements network identifiers in the form of real IMSI addresses and MSC or SGSN addresses to accommodate interworking with other network elements.

In one embodiment, the MT message is received by the receiving node over SMPP links, an originator MSISDN is extracted, validity of the originating MSISDN and its association with the source network is checked by performing a SRI-for-SM operation for the originating MSISDN. In one embodiment, the SRI-for-SM operation is performed towards a local HLR or other database such as a number portability database, and upon completion of this operation a further validity check is performed.

In another aspect, the invention provides a node of a mobile network comprising digital data processors and ports for transmitting and receiving data, wherein the node is programmed to perform the steps of a method as defined above in any embodiment.

In a further aspect, the invention provides a computer readable medium comprising software code adapted to perform the steps of a method as defined above in any embodiment when executing on a digital processor or processors.

BRIEF DESCRIPTION OF THE DRAWINGS

The invention will be more clearly understood from the following description of some embodiments thereof, given by way of example only with reference to the accompanying drawings in which.

DESCRIPTION OF THE DISCLOSURE

Within the context of "grey routes" detection, this invention matches the ranges of originating addresses of the message delivering entities (e.g. SMS Service Centres) and of the queried ones (i.e. the HLRs/HSSs from foreign PLMNs). It makes use of known operations such as MT-FSM and SRI-for-SM or ATI, ATM to validate the legitimacy of the route the message delivery followed.

Next to "grey routes" detection, this invention extends the SMS anti-fake approach described in our prior published specification number US2008/092225. By initiating the additional SRI-for-SM or ATI or ATM operations in the context of "grey routes", it also validates the authenticity of the foreign message originator by analysing the response code of the query request.

Although some of the tools (i.e. the operations) used are the same as in the earlier mentioned filings, this invention applies them to different type of traffic (i.e. foreign MT-FSM) and the information analysed is different (i.e. it does not in some embodiments make use of the originating switch/address of the originating number provided in the answer from HLR/HSS).

Figure 1:
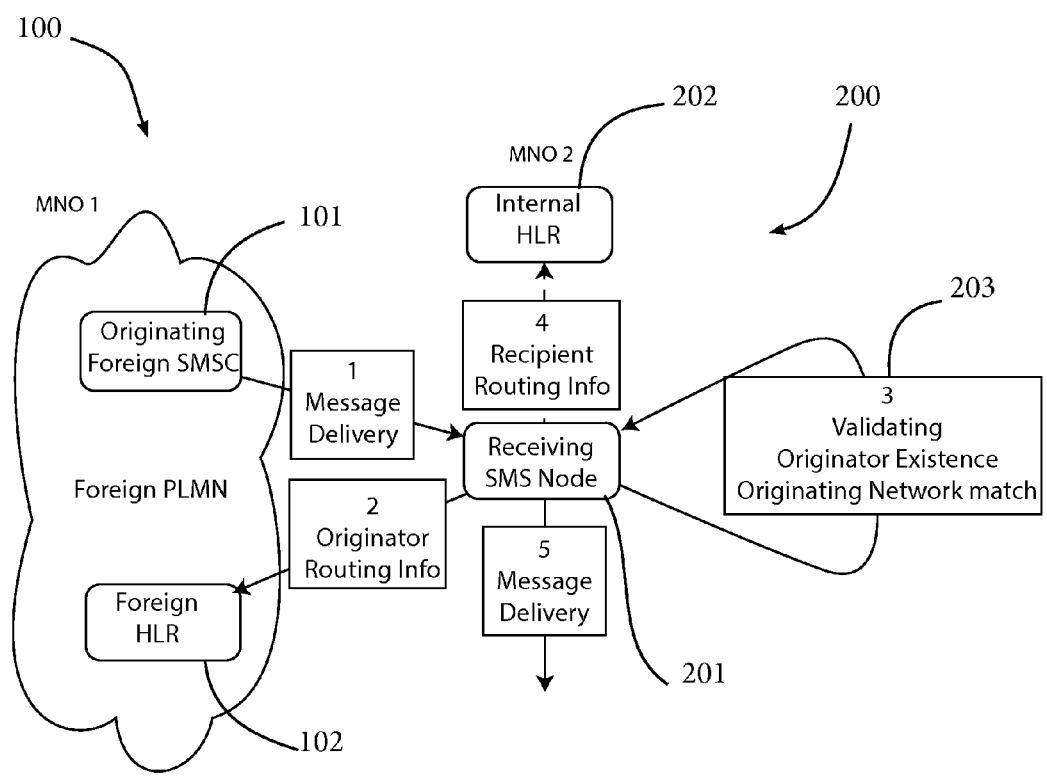
FIG. 1 is a high level flow diagram illustrating major steps of the invention for SMS fraud detection.

Referring to FIG. 1 a network MNO1 (i.e. foreign PLMN) sends an SMS to a network MNO2 (i.e. home PLMN). In the originating network MNO1 a SMSC 101 originates an SMS delivery session for delivery of a message to a recipient device in the network MNO2. The originating network MNO1 also has a HLR (102). There is a receiving node 201 in the receiving network MNO2.

Importantly, the receiving node 201 performs a query on the address of the originator of the foreign PLMN MNO1 (step 2) and then also validates this as set out in step 3 of FIG. 1.

The node 201 querying the HLR 102 is not to determine the serving VLR address, nor is it performed to determine an address of the originator device such as an originator MSISDN, but rather to:
 (a) validate the existence of the already-received information such as originator MSISDN, and
 (b) subsequently to identify whether the responding HLR 102 is part of the same network as the source SMSC 101 delivering the MT-FWD-SM message.

The home PLMN MNO2/200 identifies the fact that the message originator is allowed to use the foreign SMS-SC (101) to deliver short messages (by comparing the address ranges of the responding foreign HLR 102 and the delivering foreign SMSC 101.

In more detail, the overall method may be summarised in one embodiment as follows:

the receiving node in the home PLMN MNO2/200 receives a message delivery (e.g, MT-FSM) request from a source delivery entity (e.g. SMSC 101) in a foreign PLMN 100 (MNO 1),
upon receiving such a request, the receiving node 201 queries the foreign network location register in this case foreign HLR 102 to validate the authenticity (i.e. the existence/availability) of the address of the originator device, such as an originator MSISDN, and
whether the addresses of the queried location register 102 matches (203) with those of the node (SMSC 101) delivering the message in an attempt to validate the legal use of the foreign PLMN (100). The node (201) validates the route of the message by comparing (3) the address of the queried location register 102 with the address of the foreign MT-FSM source node (101), to verify the association of the foreign source node with a foreign location register.

The validation is performed before attempting to perform tasks for delivery of the message.

Figure 2:
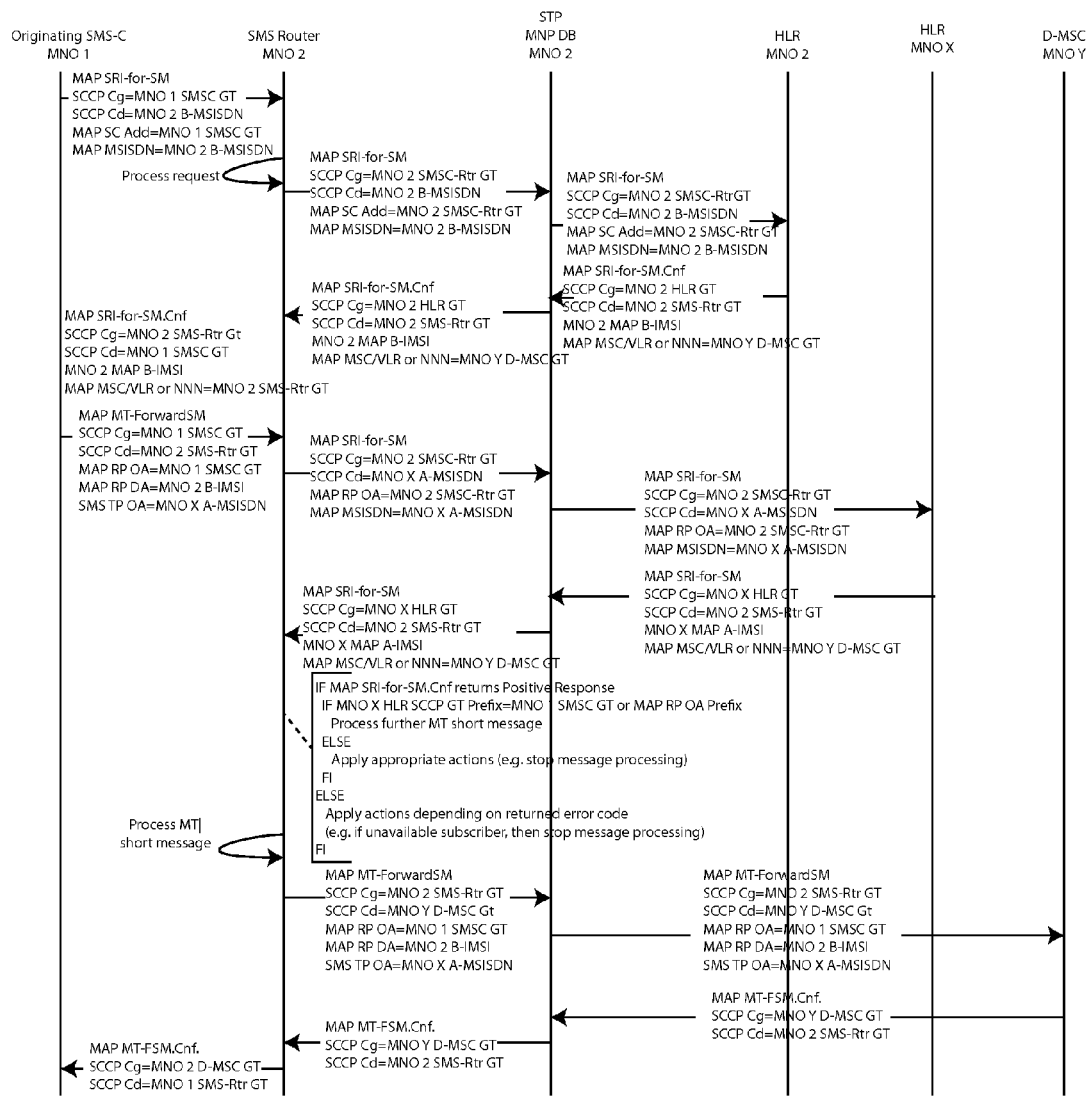
FIGS. 2 and 3 are "ladder" message sequence diagrams illustrating the steps in more detail for two different scenarios.

FIG. 2 shows the full detail of the interactions for implementation of the invention for the scenario where the SMS node 201 queries where to route the message.

SMS delivery takes places in two steps:
 1. An SRI-for-SM request is sent out to query the location of the recipient;
 2. Upon receiving a valid SRI-for-SM response, the MT-FSM is initiated towards the recipient.

Both of this operations are received by the SMS node (201) (that intercepts foreign SMS traffic for monitoring/screening purposes before passing it further towards the recipients).

At the start of the session a message delivery request (i.e. MT-FSM) 1 is sent to the SMS node 201. This sends in step 2 a request to the HLR 102 of the supposedly originating foreign PLMN MNO1 for routing information concerning the originator. Upon receiving the response from the HLR 102, it requests validation of the retrieved information as listed in 203, to validate both the foreign originator and the originating foreign PLMN MNO1.

The SMS node 201 also makes the conventional HLR 202 look-up for the recipient in step 4, before performing message delivery in step 5.

As shown in FIG. 2 the sending SMS node 101 first queries where to route the message. The receiving SMS node 201 advises that the message needs to be routed to it, known as foreign message interception, and answers this query.

Once the MT-FWD-SM message is received the originator MSISDN is extracted along with the sending SMS node identification. To verify the validity of the originating foreign MSISDN and its association with the source network a SRI-for-SM operation for the originating foreign MSISDN is performed (step 2 in FIG. 1). Upon completion of this operation the following items (a) and (b) are checked as part of the invention. This is step 3 in FIG. 1, shown in more detail by means of the operations performed by the "SMS Router MNO 2" node in FIG. 2 after receiving the MAP SRI-for-SM from "HLR MNO X". MNO X may be, and indeed is likely to be, MNO1.
(a) The response code—this step validates the authenticity of the MSISDN.
In case of a negative response, the error code may indicate an unavailable number. Such a result indicates a potentially forged MSISDN.
This could translate into an attempt of a content provider to make use of a grey route. The need to hide one's identity can be triggered by economical aspects (such as unattractive price policy of the targeted operator) or purely due to SPAM attacks.
In case of a positive response the location and the International Mobile Subscriber Identifier (IMSI) of the originating MSISDN is received. The location is received in the form of an MSC or SGSN address allowing for isolation of the originating location within the originating network. The IMSI received is used to verify the association of the subscriber with the originating operator.
(b) The SCCP CgPa GT address digits identifying the source address of the responding HLR.
These address digits are used to compare the addresses belonging to the responding HLR and the SMS node originating the MT short message. As a specialization a configurable number of digits (e.g. the first X digits, the last Y digits) are used in the comparison. That is the SCCP CgPa GT address digits of the responding HLR are compared against the address digits identifying the originating foreign SMS node.
When the compared addresses appear to belong to different operators additional analysis is required as this can relate to a potential fraud case.
Such a situation can be caused by "open SMS-SCs" (i.e. SMS-SCs that do not impose any address screening on submission); interconnect agreements deemed to be legal on the initiating side but illegal on the receiving side of message trajectory.

Figure 3:
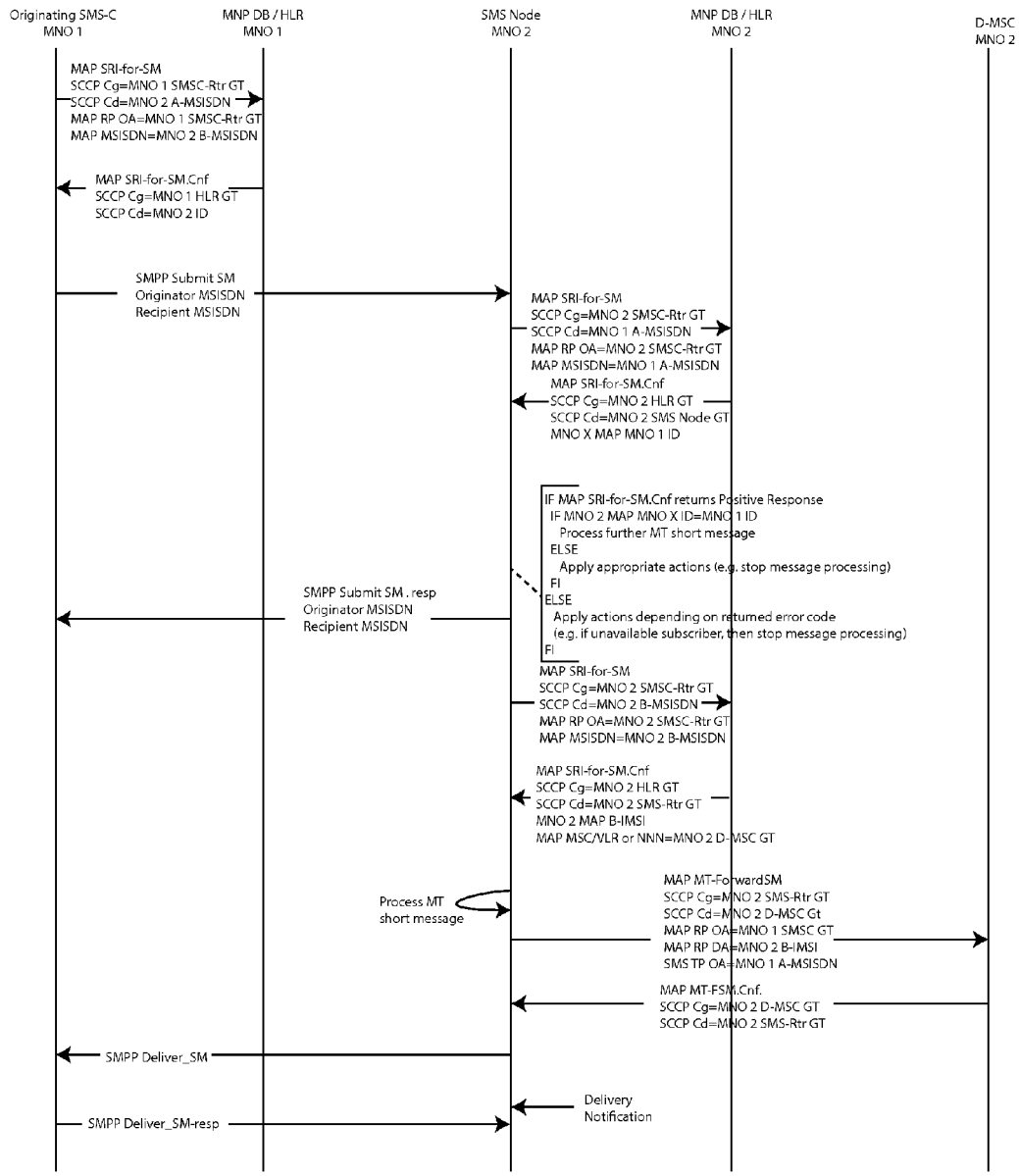

In another option, the message is received without the need to answer a routing query. This option is relevant in case of mobile network interconnectivity based on SMPP links. This option is shown in FIG. 3. In these environments, the initial interrogation of the recipient location is made towards the local HLR 102. The HLR response in this case would indicate that the recipient belongs to another mobile network through an identifier that is eventually used to route the message over an SMPP interconnect link.

In many cases mobile operators implement network identifiers in the form of real IMSI addresses and MSC or SGSN addresses to accommodate interworking with other network elements in operator's environment.

Similar to the SS7-based interconnectivity, once the MT message is received by the receiving SMS node 201 over SMPP links, the originator MSISDN is extracted. To verify the validity of the originating MSISDN and its association with the source network a SRI-for-SM operation for the originating MSISDN is performed. In this case the SRI-for-SM operation is performed towards the local HLR/MNP DB 202. Upon completion of this operation the following item (c) is checked as part of the invention. This is step 3 in FIG. 1, shown in more detail by means of the operations performed by the "SMS Router MNO 2" node in FIG. 3 after receiving the MAP SRI-for-SM response from the local HLR or MNP DB of MNO2.
(c) The response code—this step validates the authenticity of the originator MSISDN.
In case of a negative response, the error code may indicate an unavailable number. Such a result indicates a potentially forged MSISDN.
This could translate into an attempt of a content provider to make use of a grey route. The need to hide one's identity can be triggered by economical aspects (such as unattractive price policy of the targeted operator) or purely due to SPAM attacks.
In case of a positive response an identifier is returned revealing the association of the originating MSISDN to the operator network that initiated the message delivery.
Such a situation can be caused by "open SMS-SCs" (i.e. SMS-SCs that do not impose any address screening on submission); interconnect agreements deemed to be legal on the initiating side but illegal on the receiving side of message trajectory. It will therefore be appreciated that the invention offers operators better control over the interconnect traffic. It provides them with better insights on actual interconnect and roaming agreements with other operators (for both the incoming and the outgoing traffic). On the other side, it offers better protection for the operator's own subscriber base, helping the operator protect its brand name and maintain subscriber loyalty.

This invention provides advantages over the recommendations and guidelines outlined by GSM Association due to SRI-for-SM operation performed for the originating subscriber of a foreign MT short message thus enabling validation of the subscriber and legitimacy of the undertaken message route.

The invention is not limited to the embodiments described but may be varied in construction and detail.

The invention claimed is:
1. A method performed by a receiving home Public Land Mobile Network (PLMN) including a receiving node, the method comprising steps of:
said receiving node receiving from a foreign source node in a foreign PLMN, a delivery request for a message having an originator and a recipient; and
said receiving node extracting from said delivery request, an extracted originator address of said originator and a foreign source node address of said foreign source node, and performing validation steps of:
(a) querying a foreign home location register having a foreign home location register address, to determine a register-provided originator address of said originator, and validating existence and availability of said extracted originator address by comparing said extracted originator address with said register-provided originator address; and
(b) verifying association of said foreign source node with said foreign home location register by comparing said foreign home location register address with said foreign source node address,
wherein said validation steps (a) and (b) are performed before attempting to perform tasks for delivery of the message.
2. The method of claim 1, wherein said validation step (b) includes identifying said foreign home location register address according to SCCP CgPa GT address digits of said foreign home location register.
3. The method of claim 2, wherein said validation step (b) uses said digits to compare said addresses of said foreign home location register and said foreign source node.

4. The method of claim 3, wherein a configurable sub-set of said digits are used in said comparison of said addresses of said foreign home location register and said foreign source node.

5. The method of claim 1, wherein said validation step (b) includes comparing SCCP CgPa GT address digits of said foreign home location register address against SCCP CgPa GT address digits of said foreign source node address.

6. The method of claim 1, wherein said validation step (b) includes comparing SCCP CgPa GT address digits of said foreign home location register address against GSM MAP Service Centre originating address digits of said foreign source node.

7. The method of claim 1, wherein said delivery request uses a protocol selected from the group consisting of SS7 and SMPP.

8. The method of claim 1, wherein for said step (a) said delivery request is an MT message received by said receiving node over SMPP links, said extracted originator address is an originator MSISDN, and validity of said originator MSISDN and its association with a source network is checked by performing a SRI-for-SM operation for said originator MSISDN.

9. The method of claim 8, wherein said SRI-for-SM operation is performed towards a database, and upon completion of said SRI-for-SM operation a further validity check is performed.

10. A group of mobile network nodes comprising digital data processors and ports for transmitting and receiving data, and being programmed to reside in a home network and perform steps of:
   receiving from a foreign source node in a foreign PLMN, a delivery request for a message having an originator and a recipient;
   extracting from said delivery request, an extracted originator address of said originator and a foreign source node address of said foreign source node; and
   performing validation steps of:
   (a) querying a foreign home location register having a foreign home location register address to determine a register-provided originator address of said originator, and validating existence and availability of said extracted originator address by comparing said extracted originator address with said register-provided originator address; and
   (b) verifying association of said foreign source node with said foreign home location register by comparing said foreign home location register address with said foreign source node address,
   wherein said validation steps (a) and (b) are performed before attempting to perform tasks for delivery of the message.

* * * * *